United States Patent [19]
Frank et al.

[11] Patent Number: 6,090,461
[45] Date of Patent: Jul. 18, 2000

[54] TEMPORARY DISPLAY DEVICE

[75] Inventors: John W. Frank, Cottage Grove; Charles A. Mathna, St. Paul, both of Minn.

[73] Assignee: 3M Innovative Properties Company, St. Paul, Minn.

[21] Appl. No.: 07/943,901

[22] Filed: Sep. 11, 1992

[51] Int. Cl.[7] .................................................. B32B 7/00

[52] U.S. Cl. ..................... 428/40.1; 40/768; 40/773; 428/42.1; 428/42.2; 428/212; 428/219; 428/220; 428/327; 428/354; 428/355

[58] Field of Search ..................... 428/40, 41, 42, 428/906, 343, 354, 355, 323, 212, 219, 220, 327; 40/158.1; 206/411

[56] References Cited

U.S. PATENT DOCUMENTS

| | | | |
|---|---|---|---|
| 3,857,731 | 12/1974 | Merrill et al. | 428/354 |
| 3,952,133 | 4/1976 | Amos et al. | 428/354 |
| 4,554,193 | 11/1985 | Erickson | 428/40 |
| 4,599,265 | 7/1986 | Esmay | 428/343 |
| 4,826,712 | 5/1989 | Theno | 428/906 |
| 4,950,517 | 8/1990 | Loggins | 428/40 |

*Primary Examiner*—Nasser Ahmad
*Attorney, Agent, or Firm*—Robert W. Sprague; Carolyn V. Peters

[57] ABSTRACT

A sheet material for mounting on a substrate such as a wall, and displaying an article such as a greeting card, comprising a film backing, a first repositionable adhesive coating on one surface, and a second repositionable coating on the other surface. The sheet material permits the article to be adhered to, repositioned on, and removed from the sheet material without removing the sheet material from the substrate to which it has been adhered.

13 Claims, 1 Drawing Sheet

TEMPORARY DISPLAY DEVICE

FIELD OF THE INVENTION

This invention relates to a device for displaying articles.

BACKGROUND

Temporary bulletin boards or display devices are known in the art, having been described, for example, in U.S. Pat. Nos. 3,857,731 and 3,952,133.

SUMMARY OF THE INVENTION

This invention provides in one embodiment a novel sheet material for mounting on a substrate and displaying an article, comprising a flexible backing, a coating of a first repositionable adhesive on a first major surface of the backing, and a coating of a second repositionable adhesive on the second major surface, the first repositionable adhesive coating providing an adhesion level per unit area of the sheet material substantially higher than that provided by the second repositionable adhesive coating by virtue of the first repositionable adhesive being more aggressive an adhesive than the second repositionable adhesive.

This invention provides in another embodiment a novel sheet material for mounting on a substrate and displaying an article, comprising a substantially smooth, flexible film backing, a coating of a first repositionable adhesive on a first major surface of the backing for removably adhering the sheet material to the substrate, and a coating of a second repositionable adhesive on the second major surface of the backing for adhering the article to the sheet material, the first repositionable adhesive coating providing a higher level of adhesion per unit area of the sheet material than the second repositionable adhesive coating by virtue of the first repositionable adhesive being more aggressive an adhesive than the second repositionable adhesive such that when the first repositionable adhesive coating is contacted with the substrate to which the sheet material is being adhered, the article which is being adhered to the second repositionable adhesive coating can be repositioned thereon and removed therefrom without removing the sheet material from the substrate. The substrate to which the sheet material may be adhered may be, for example, a painted wall.

Examples of articles which may be adhered to the exposed surface of the sheet material of the present invention, once it has been adhered to the substrate, include greeting cards, photographs, recipe cards and the like. If desired the sheet material may have a decorative design.

Preferred sheet materials of the present invention are characterized by the adhesion level provided by the first repositionable adhesive coating being at least about 50 gram/cm width higher (most preferably at least about 100 gram/cm width higher) than that provided by the second repositionable adhesive coating when tested according to Test Method A (hereinafter described). This provides a sheet material which permits particularly desirable positioning, repositioning and removal of articles, without removal of the sheet material from the substrate to which it has been adhered.

Alternate preferred sheet materials of the present invention are characterized by the adhesion level provided by the second repositionable adhesive coating being between about 30 and about 55 gram/cm width when tested according to Test Method A. If the second repositionable adhesive coating provides an adhesion level of less than about 30 gram/cm width, larger or heavier article such as a large greeting card may not adhere suitably to the sheet material. On the other hand, an adhesion level greater than about 55 gram/cm width may result in damage to the article particularly if it is, for example, a linen or rice paper greeting card.

Most preferred sheet materials of the present invention combine the features described in the immediately foregoing two paragraphs.

The sheet materials of the present invention desirably may be mounted on, for example, a wall for displaying articles which may be repositioned and removed from the sheet material. When it is no longer desired to display the articles the sheet material may be removed from the wall without marring or otherwise damaging the wall surface.

DETAILED DESCRIPTION OF THE PREFERRED EMBODIMENTS OF THE INVENTION

Figure 1:
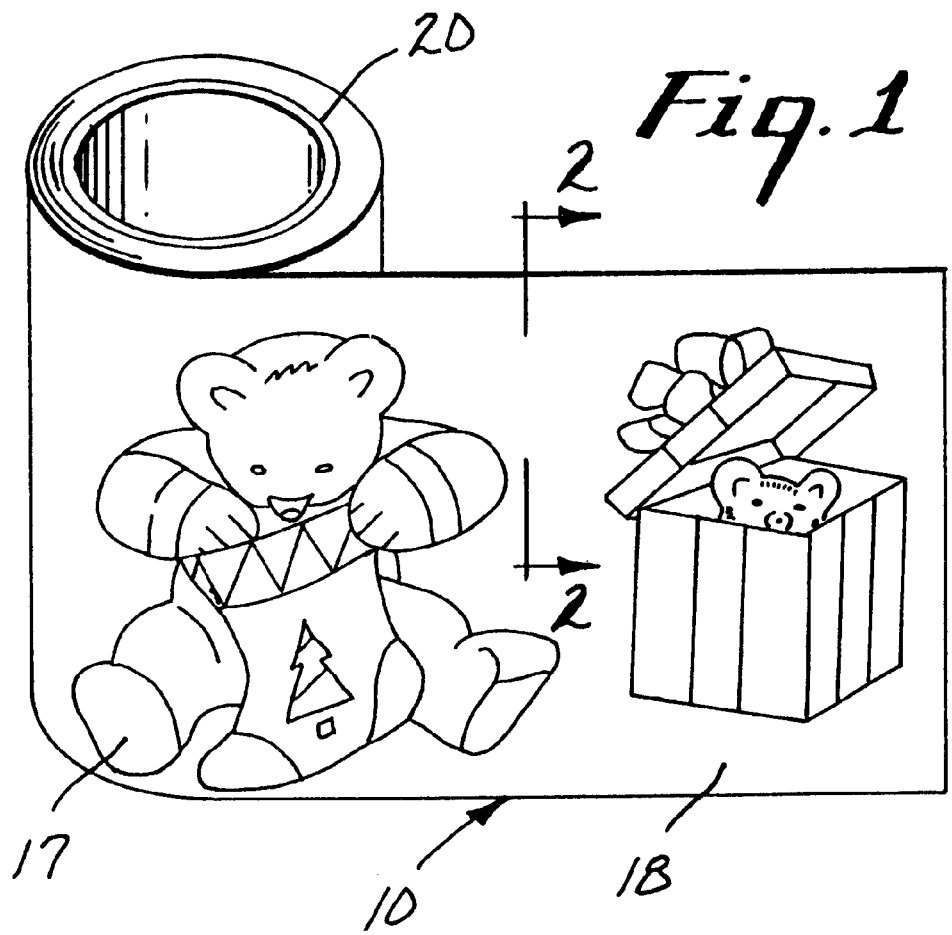
FIG. 1 is a perspective view of a sheet material according to the present invention convolutely wound in a roll.
Figure 2:
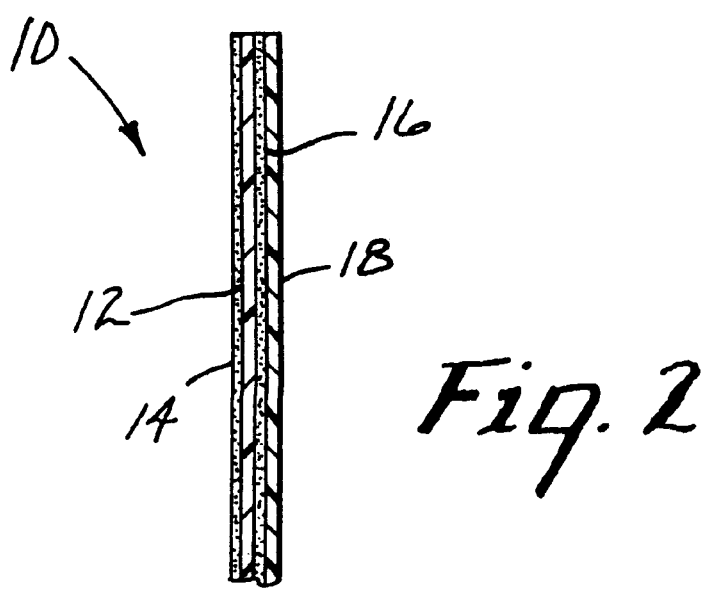
FIG. 2 is a cross-sectional view of the sheet material illustrated in FIG. 1 taken along the line 2—2.

As illustrated in FIGS. 1 and 2, sheet material 10 comprises flexible film backing 12, a first coating of a repositionable adhesive 14 on the backside of backing 12 and a second coating of a repositionable adhesive 16 on the front side of backing 12. Generally, adhesive 14 provides a higher level of adhesion per unit area of sheet material 10 than adhesive 16 (i.e., adhesive 14 is a more aggressive repositionable adhesive than adhesive 16 and a difference in adhesion level is not provided merely through application of different coating weights of the same adhesive) and is the means by which sheet material 10 can be adhered to a substrate such as a painted wall. Adhesive 16 provides the means by which an article such as a greeting card can be adhered to sheet material 10. The surface of backing 12 adjacent adhesive 16 may include a decorative design such as a Christmas motif 17. Sheet material 10 is further illustrated as having a release liner 18 adhered to adhesive 16.

FIG. 1 illustrates sheet material 10 convolutely wound in roll 20. Adhesives 14 and 16 and release liner 18 are selected so as to provide for preferential adherence of release liner 18 to adhesive 16 when sheet material 10 is unwound from roll 20. Upon such unwinding, adhesive 14 of sheet material 10 may then be contacted with the substrate to which sheet material 10 is to be adhered. Removal of release liner 18 then exposes adhesive 16 of sheet material 10 to permit adherence of a greeting card or other article thereto.

Suitable materials for use as backing 12 are films comprising plasticized polyvinyl chloride, polyethylene or polypropylene. Typically backing 12 will have a thickness of about 0.05 to about 0.15 mm, and will preferably have a thickness of about 0.075 to about 0.125 mm. A preferred film backing comprises a) about 60–98% by weight of an ionomeric polymer resin having a melt flow index greater than about 10; and b) about 2–4% by weight of a filler material that is not an ionomeric polymer. Films of this type are described in applicant's assignee's copending application U.S. Ser. No. 07/702,065, filed May 17, 1991, now U.S. Pat. No. 5,198,301 incorporated herein by reference. The most preferred film backing of the foregoing type is 0.102 mm in thickness and comprises 83 parts by weight Surlyn™ 1702, an ionomer available from E.I. Du Pont de Nemours Co., as the ionomeric polymer and 17 parts by weight of Ampacet™ 11748 pigment concentrate commercially available from Ampacet Corporation as the filler. Example 1 of said application U.S.S.N. discloses a method by which this most preferred film backing may be made. A preferred backing is in the form of an elongated strip having a width of about 2 to 5 inches (5.08 to 12.7 cm).

Adhesive 14 may be selected from conventional repositionable adhesives which permit sheet material 10 to be adhered to and subsequently removed substantially cleanly from the substrate such as a painted wall to which it is to be or has been adhered. Adhesive 16 similarly may be selected from conventional repositionable adhesives. However, in the case of adhesive 16, it should be selected to provide the ability to repeatedly adhere articles thereto and repeatedly remove them therefrom without significant loss of adhesive capability. Particularly when sheet material 10 is to be reused or repositioned after an initial use, adhesive 14 too should permit repeated adherence to and removal from substrates without significant loss of adhesive capability. Examples of adhesives which may be used as adhesive 14 are disclosed in U.S. Pat. No. 3,691,140 to Silver, incorporated herein by reference, which patent relates to solid tacky microspheres. Repositionable adhesives are also known in which microspheres contained in the adhesive are non-tacky. A disclosure of this type of adhesive is provided in U.S. Pat. No. 4,735,837 to Miyasaka, incorporated herein by reference. Repositionability may also be achieved by other techniques, such as pattern coating of the adhesive.

Preferably, the repositionable adhesive employed as adhesive 14 comprises between about 60–100% by weight of hollow, polymeric, acrylate, inherently tacky, infusible, solvent-insoluble, solvent-dispersible, elastomeric pressure-sensitive adhesive microspheres having a diameter of at least 1 micrometer, and between about 0–40% by weight of a non-spherical polyacrylate adhesive. These hollow microspheres are made in accordance with U.S. Pat. No. 5,045,569, incorporated herein by reference. The non-spherical polyacrylate adhesive may be any conventional pressure-sensitive adhesive. Examples of such adhesives are polymers made from the "soft" monomers such as n-butyl acrylate, isooctyl acrylate, or the like, or copolymers made from a soft component, such as isobutylene, n-butyl acrylate, isooctyl acrylate, ethyl hexyl acrylate, or the like; and a polar monomer such as acrylic acid, acrylonitrile, acrylamide, methacrylic acid, methyl methacrylate or the like as described in U.S. Pat. No. Re. 24,906 to Ulrich, incorporated herein by reference. A preferred class of non-spherical polyacrylate adhesives are commercially available, for example, as the Rohm & Haas Rhoplex™ line of adhesives. Preferably, the nonspherical polyacrylate adhesive is present in the repositionable adhesive at an amount of about 10–35% by weight.

While other repositionable adhesives are generally effective to support sheet material 10 as presently described, the repositionable adhesive comprising hollow microspheres are particularly effective for holding sheet material 10 having a large dimension to vertical surfaces. This increased holding power is particularly required where the film to be supported has a surface area exceeding about 0.3 square meters. When the repositionable adhesive additionally comprises a non-spherical polyacrylate adhesive, improved anchorage of the total adhesive to the film is observed, resulting in less adhesive residue being left on the substrate after removal. Also, repositionable adhesives comprising non-spherical polyacrylate adhesives exhibit excellent shear adhesion properties, even for highly textured vertical surfaces. These advantageous adhesive properties are obtained without excessive adhesion to substrates such as painted walls that would result in peeling of the paint off of the wall when sheet material 10 is removed. Improved anchorage, shear and adhesion properties are also observed for this adhesive when used with other film backings, such as polyvinyl chloride backings.

Adhesive 16 which may also be of the type described above in the context of adhesive 14, should be selected to provide a lower adhesion level to articles adhered to sheet material 10 than the adhesion level between adhesive 14 and the substrate to which it has been adhered.

Preferred adhesives for use as adhesive 16 comprise between about 40–80% by weight of solid, polymeric, acrylate, inherently tacky, infusible, solvent-insoluble, solvent-dispersible, elastomeric pressure-sensitive microspheres of the type disclosed in said above-mentioned U.S. Pat. No. 3,691,140, and between about 20–60% by weight of a non-spherical polyacrylate adhesive of a type described above in the context of adhesive 14.

Release liner 18 may be any conventional release liner which provides for preferential adherence to adhesive 16 when sheet material 10 is unwound from roll 20. Preferably, the release liner releases from adhesive 16 at a value of less than about 15 grams/cm width when measured according to ASTM P3330-78, Method C, incorporated herein by reference. Release values higher than about 15 grams/cm width may cause undesired removal of the sheet material 10 from the substrate to which it has been adhered when the release liner is removed from adhesive 16.

The preferred release liner is that commercially available from Release Technology, Inc., of West Chicago, Ill., under the trade designation 2-HID-SC288B/ST80A-NAT. This liner has a release coating on one surface which provides for lower release than a different release coating which is present on the other side. Another preferred release liner is also available from Release Technology, Inc. under the trade designation 2-HID-ST80A/ST80A-NAT.

TEST METHOD

Test Method A

This Test Method A is generally described in ASTM P3330-78, Method C, incorporated herein by reference. Test Method A is conducted as follows. A 2×5 inch (5.08 cm×12.7 cm) strip of double faced adhesive tape available from 3M under the trade designation "410" is applied to the steel panel of a 90 degree test fixture. A sheet material to be tested is applied to the double faced tape with the adhesive coating of the sheet material to be measured facing outwardly. A 1.25×7 to 9 inch (3.2×17.78 to 22.86 cm) polyester film 0.9 mil (0.2 mm) in thickness (available under the trade designation OR-16™ from 3M Company of St. Paul, Minn.) is applied to the adhesive surface being measured with two passes of a 4.5 lb (9.9 kg) roller rolled at a rate of between 30 and 60 cm/min. One end of the polyester film is then placed in the upper jaw of a Instron™ tensile tester (available from Istron Corp. of Canton, Mass.) and is pulled at a 90 degree angle relative to the steel plate at the rate specified in ASTM P3330-78, Method C. A 1000 g load cell is used. The adhesion value in grams per centimeter of width is then determined. Three samples of a given sheet material are tested and the values are averaged.

The above-described method is designated "Test Method A" in the instant specification and claims.

EXAMPLE 1

An adhesive composition for the wallside (the first repositionable adhesive coating) of the sheet material of this example was prepared by combining 75 parts by weight of a hollow microsphere adhesive of the type disclosed in said above-mentioned U.S. Pat. No. 5,045,569 and 25 parts by weight of Rohm & Haas N-1031 butyl acrylate/acrylonitrile pressure sensitive latex adhesive.

An adhesive composition for the cardside (the second repositionable adhesive coating) of the sheet material of this example contained 59 wt. percent of a solid microsphere adhesive of the type disclosed in said above-mentioned U.S. Pat. No. 3,691,140, 23.76 weight percent of a 95.5:4.5 isooctyl acrylate:acrylic acid pressure-sensitive adhesive polymer prepared as described in said above-mentioned U.S. Pat. No. Re 24,906, and 17.24 wt. percent of Elvacite™ 2045 (an acrylic polymer commercially available from E.I. Du Pont de Nemours Co.).

The above adhesive compositions were applied to the respective sides of an elongated, 3.5 inch (8.89 cm) wide, 3.5 mil (0.089 mm) thick film backing prepared as described in Example 1 of said above-mentioned application U.S. Ser. No. 07/702,065 now U.S. Pat. No. 5,198,301, but using 83 parts by weight of Surlyn™ 1702 ionomer and 17 parts by weight of Ampacet™ 11748 pigment. The dry coating weight of the first repositionable adhesive coating was between about 3.5 to 4.5 grains/24 inch$^2$ (14.65 to 18.84 gram/m$^2$), and that of the second repositionable adhesive coating was between about 1.5 to 3.5 grains/24 inch$^2$ (6.28 to 14.65 gram/m$^2$). A Christmas decorative design was printed on the film backing before application of the adhesive coating using Louis O. Weneke 4000J series inks (available from Louis O. Weneke Company, of Plymouth, Minn.).

When tested according to Test Method A, adhesion values exhibited by the three samples evaluated ranged from about 150 to 200 gram/cm length for the first repositionable adhesive coating, and from about 32.7 to 48.8 gram/cm length for the second repositionable adhesive.

The release liner employed was that commercially available from Release Technology, Inc., West Chicago, Ill., under the trade designation 2-HIDSC288B/ST80A-NAT.

The sheet material of this Example adhered suitably to painted walls and permitted greeting cards to be repeatedly adhered to and repositioned on the sheet material without removal of the sheet material from the wall and without significant loss of adhesion capability of the second (cardside) repositionable adhesive coating. Further, essentially no observable adhesive transfer or damage to the greeting card occurred.

What is claimed is:

1. A sheet material for mounting on a substrate and displaying an article, comprising a substantially smooth, flexible film backing, a coating of a first repositionable adhesive on a first major surface of said backing for removably adhering said sheet material to said substrate, and a coating of a second repositionable adhesive on a second major surface of said backing for, adhering said article to said sheet material, said first repositionable adhesive coating providing a higher level of adhesion per unit area of said sheet material than said second repositionable adhesive coating by virtue of said first repositionable adhesive being more aggressive an adhesive than said second repositionable adhesion such that the adhesion level provided by said first repositionable adhesive coating is at least about 50 gram/cm width higher than that provided by said second repositionable adhesive coating when tested according to Test Method A, and the adhesion level provided by said second repositionable adhesive coating is about 30 to about 55 gram/cm width when tested according to Test Method A, such that when said first repositionable adhesive coating is contacted with said substrate to which said sheet material is being adhered, said article which is being adhered to said second repositionable adhesive coating can be repositioned thereon and removed therefrom without removing said sheet material from said substrate.

2. A sheet material according to claim 1, wherein said substrate is a painted wall of a room and said article is selected from the group consisting of a greeting card, and a photograph and a recipe card.

3. A sheet material according to claim 1, wherein said first repositionable adhesive coating and said second repositionable adhesive coating comprise tacky microspheres.

4. A sheet material according to claim 1, wherein said second repositionable adhesive coating is substantially transparent.

5. A sheet material according to claim 4, wherein said second major surface of said backing has a decorative design thereon.

6. A sheet material according to claim 1, further comprising a release liner adhered to said second surface.

7. A sheet material according to claim 6 in elongated form and convolutely wound in a roll.

8. A sheet material according to claim 7, having a width of about 2 to 5 inches.

9. A sheet material according to claim 7, wherein when said sheet material is unwound, the level of adhesion between said release liner and said first repositionable adhesive coating and said release liner and said second repositionable adhesive coating is such that said release liner remains adhered to said second repositionable adhesive coating.

10. A sheet material according to claim 6, wherein when said sheet material is adhered to a substrate by said first repositionable adhesive coating, said release liner can be removed from said second repositionable adhesive coating without removing said sheet material from said substrate.

11. A sheet material according to claim 10, wherein said substrate is a wall of a room.

12. A sheet material according to claim 10, wherein said release liner can be removed from said second repositionable adhesive coating with a release value of less than about 15 grams/cm width when tested according to ASTM P3330-78, Method C.

13. A sheet material for mounting on a substrate and displaying an article, comprising a flexible backing, a coating of a first repositionable adhesive on a first major surface of said backing, and a coating of a second repositionable adhesive on a second major surface, said first repositionable adhesive coating providing an adhesion level per unit area of said sheet material substantially higher than that provided by said second repositionable adhesive coating by virtue of said first repositionable adhesive being more aggressive an adhesive than said second repositionable adhesive such that the adhesion level provided by said first repositionable adhesive coating is at least about 50 gram/cm width higher than that provided by said second repositionable adhesive coating when tested according to Test Method A, and the adhesion level provided by said second repositionable adhesive coating is about 30 to about 55 gram/cm width when tested according to Test Method A.

* * * * *